Oct. 5, 1965    W. P. HENDAL ET AL    3,210,268
PROCESS AND APPARATUS FOR CARRYING OUT CHEMICAL
REACTIONS WITH THE AID OF MOLTEN HEATING MEDIA
Filed July 16, 1962    2 Sheets-Sheet 1
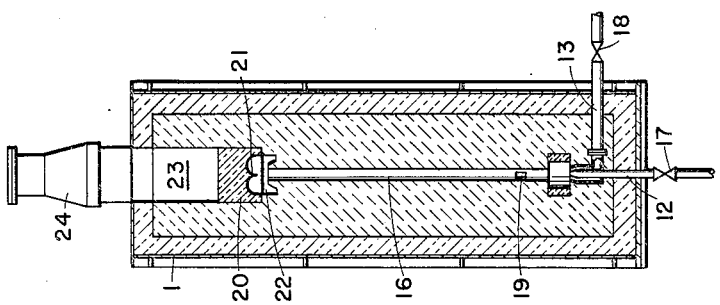
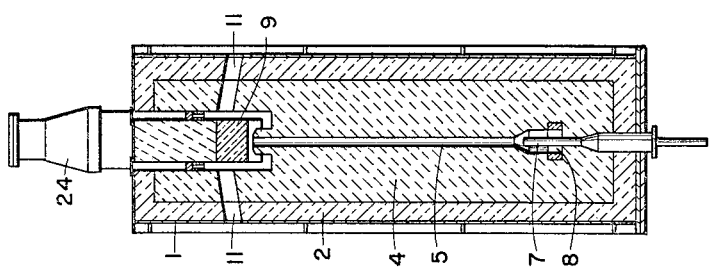
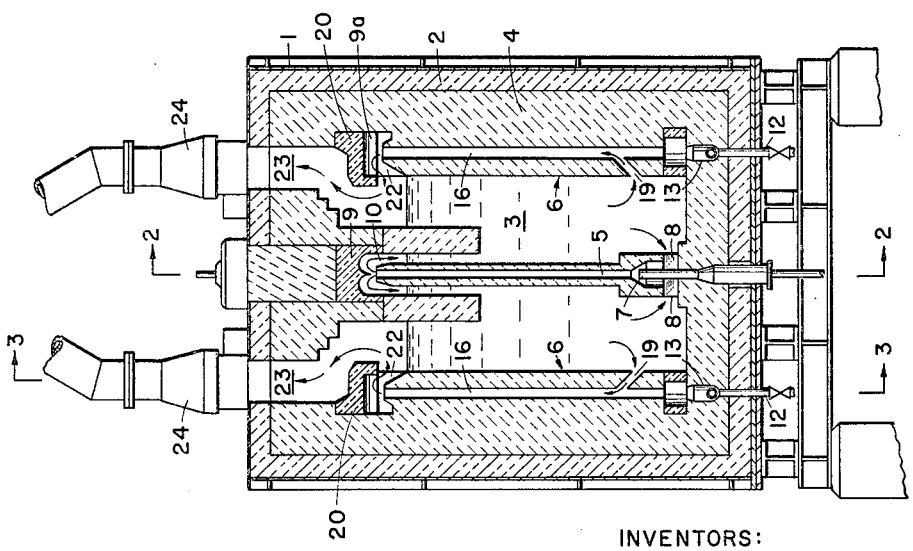
INVENTORS:
WILLEM P. HENDAL
PIETER VISSER
BY: *Oswald J. Milmore*
THEIR ATTORNEY

United States Patent Office 3,210,268
Patented Oct. 5, 1965

3,210,268
PROCESS AND APPARATUS FOR CARRYING OUT CHEMICAL REACTIONS WITH THE AID OF MOLTEN HEATING MEDIA
Willem P. Hendal and Pieter Visser, Amsterdam, Netherlands, assignors to Shell Oil Company, New York, N.Y., a corporation of Delaware
Filed July 16, 1962, Ser. No. 210,114
Claims priority, application Netherlands, July 20, 1961, 267,291
11 Claims. (Cl. 208—125)

This invention relates to a process and apparatus for carrying out endothermic chemical reactions, in particular the cracking of hydrocarbons at high temperature, with the aid of molten, normally solid heating media, such as salts or metals, to supply heat.

The performance of chemical reactions with the aid of molten salts is well known. In our copending application, Serial No. 27,634 of May 9, 1960, now Patent No. 3,081,256, we described a method and apparatus for carrying out such reactions in which the heat of reaction is supplied to the base material to be reacted by molten salt entrained by the base material through a tubular reaction zone from a regeneration zone, wherein the molten salt is brought into contact with oxygen or a gas containing oxygen, in consequence of which the carbonaceous contaminants formed in the reaction and which are suspended in the molten salt mass returned to the regeneration zone, are oxidized. If necessary, additional heat is supplied by introducing a liquid or a gaseous fuel into the regeneration zone, which fuel is then burnt with the above-mentioned oxygen or oxygen-containing gases, which are also introduced into this zone. Extra heat can also be supplied to the molten salt by passing through the salt hot combustion gases from a burner situated outside of the regeneration zone.

If it is necessary to supply a considerable amount of heat to the molten medium, viz., salt, which may, for example, be the case when strongly endothermic reactions are being carried out, and/or when working at a large rate of throughput of the base material to be reacted and, hence, of the molten heat-transfer medium, it has been found impossible to supply the required amount of heat in the manner described above. It has been found that when coniderable quantities of hot combustion gases are permitted to rise freely through the liquid mass the result may be, that the liquid is ejected from the vessel with the combustion products. Furthermore, large bubbles of gas may be formed, which as a result of the unfavorable ratio between the surface area and the mass of gas may be the cause of inadequate heat exchange.

The invention provides a method and apparatus with which it is possible to supply to the molten heat transfer medium the heat required for carrying out endothermic chemical reactions using molten metals or salts as the heat transfer medium.

The invention therefore relates to a process for carrying out endothermic chemical reactions at high temperatures by means of molten metals or salts as the heat transfer medium, the heat required for the reaction being supplied to the molten mass by burning a liquid or gaseous fuel in one or more burners, entraining the molten medium in the combustion gases in a finely divided state, e.g., by ejector action, and then separating the medium from these gases. To afford time for the transfer of heat from the combustion gases to the molten medium the dispersion of gases and molten medium is preferably flowed through a contacting zone, such as a narrow, vertically elongated riser passage.

The invention furthermore relates to an apparatus for carrying out endothermic chemical reactions at high temperatures by means of molten metals or salts as the heat transfer medium, consisting of one or more tubular reactors provided with lines for the supply of base materials and the discharge of reaction products, and one or more combustion heaters for supplying to the molten mass the heat required for the reaction, which heater(s) is (are) provided with lines for the supply of fuel and oxygen or oxygen-containing gas and with line for the discharge of combustion gases, the heater(s) being in open communication with a chamber containing the molten heat transfer medium, in such a manner as to cause the molten heat transfer medium to be entrained in a finely divided state with the combustion gases by ejector action when the heater(s) is (are) in operation.

Generally, all endothermic chemical reactions that proceed at high temperature and require a short contact time can be carried out by means of the process and the apparatus according to the invention. The invention is particularly suitable for the manufacture of ethylene, propylene and acetylene by cracking higher hydrocarbons, such as natural gas, refinery gas, mineral oil distillates, such as naphtha, or residual oils. An example of another reaction that can be carried out by means of the process and the apparatus, respectively, according to the invention, is the preparation of vinyl chloride by pyrolysis of dichlorethane.

The temperature of the heat transfer medium must, of course, be selected to suit the reaction concerned. For preparing ethylene and propylene by cracking higher hydrocarbons temperatures of from 800 to 1000° C. are preferably used, depending on the nature of the starting material. For preparing acetylene from similar base materials somewhat higher temperatures are required, viz. of 1100 to 1300° C. Usually reaction temperatures are lower when the base material consists of heavy hydrocarbons than when it consists of light hydrocarbons.

The heat transfer medium is preferably a metallic salt or a mixture of metallic salts which under the conditions at which the reaction is carried out has low volatility, so that no salts escape from the apparatus with the reaction products or the combustion gases. When mixtures of salts are applied, eutectic mixtures are preferably used. Moreover, it is desirable that the medium does not attack the construction materials of the apparatus. In most of these reactions the salt serves solely as a heat transfer medium and should, therefore, not react chemically with either the base material or the reaction products. Particularly suitable salts are the halides, preferably the chlorides, of the alkaline and alkaline earth metals, such as sodium chloride, potassium chloride and barium chloride, or the corresponding fluorides and mixtures of these salts. However, other metallic salts can also be used, such as sulphates, sulphides and cyanides, and metals such as lead or tin, or alloys, such as Wood's metal. Some of the salts suited to the process are often called hardening salts in the metallurgical industry.

The combustion heater used for the process and in the apparatus according to the invention consists, in its simplest form, of a nozzle provided with supply lines for fuel and for oxygen or oxygen-containing gas, and a riser tube, which, at the end adjoining the nozzle, has openings for drawing in the molten heat transfer medium from a source, e.g., a reservoir, regenerator, or post-reaction separator, and is open at the other end. Preferably, the supply line for the fuel is situated at the center of the nozzle, the oxygen or oxygen-containing gas entering through a coaxial annular slit around the fuel inlet. The riser tube is preferably placed coaxially with the burner nozzle.

It is clear that as the riser tube is longer, the heat transfer can be better. On the other hand, unnecessary length of this tube will preferably be avoided for constructional reasons. Generally the length of the riser tube is so chosen as to make the length/diameter-ratio between 5:1 and 30:1.

The riser tube which is preferably placed in an approximately vertical position with the open end at the top, and is provided at the top with a device for separating the combustion gases from the entrained liquid. In a very suitable design for this purpose, centrifugal force is utilized to promote separation, by which the entrained liquid is expelled against a curved wall and thus separated from the combustion gases. Preferably the combustion gases are discharged in a direction that avoids their passing through the returning stream of liquid, so as to prevent the liquid from being redispersed in the gas stream.

With the construction of the heater as described, detonating combustion may occur at larger throughputs, in consequence of which the molten mass moves in violent jerks, or combustion takes place outside the riser tube. A construction of the heater in which this cannot occur includes a precombustion chamber having one or more burner nozzles with the feed lines for fuel and oxygen or oxygen-containing gas. Preferably, the feed lines for the fuel are in the center of the nozzles, those for the oxygen or oxygen-containing gas being placed coaxially around the supply lines for the fuel. The burner nozzles are preferably fitted with a cooling jacket, to prevent the temperature of the combustion chamber wall from becoming excessively high.

The precombustion chamber has at the top a discharge opening through which the combustion gases can escape to the riser tube, which is connected directly to it. The diameter of this opening is slightly smaller than the diameter of the riser tube, in order to produce a high velocity in the combustion gas, thereby insuring a good ejector effect and preventing the heat transfer medium from entering the precombustion chamber. The riser tube is preferably coaxial with the opening in the precombustion chamber.

This construction secures the initiation of the combustion in a zone in which there is no heat transfer medium, which is conducive to stability of combustion. The openings for drawing liquid heat transfer medium into the riser tube are, in this construction, in the riser tube wall, immediately above the precombustion chamber.

Because of the particularly intimate mixing effected in the riser, premixing of the fuel and the oxygen or oxygen-containing gas is not necessary.

In order to control the temperature and the flow rate of the combustion gases in the riser tube, an additional gas stream can be introduced, either into the precombustion chamber, or into the riser tube. This additional gas may be air, or an inert gas.

Owing to the high velocity of the combustion gases in the riser tube the molten heat transfer medium is drawn in through the openings in the riser tube, in consequence of which the kinetic energy of the combustion gases is in part transferred to the heat transfer medium, so that a considerable circulation of the heat transfer medium occurs. It is consequently possible to omit the separate regeneration of the molten heat transfer medium by oxidation of the carbonaceous contaminants. The removal of these contaminants is then achieved by feeding to the combustion heater a small excess of oxygen or oxygen-containing gas, by which the contaminants in the entrained heat transfer medium are oxidized in the riser to carbon monoxide, carbon dioxide and (if the contaminants also contain hydrogen) water.

As a result of the high rate of circulation of the molten heat transfer medium through the heater the average lapse in time between the heat transfer in the reactor and the regeneration in the combustion heater is quite short, and, in consequence, the carbonaceous contaminants are oxidized before they can give rise to the formation of graphite. It has appeared that this graphite is very difficult to remove by oxidation and might therefore give rise to permanent contamination of the heat transfer medium.

The invention will now be further elucidated with reference to the drawing forming a part of this specification showing two embodiments by way of illustration, wherein:

FIGURE 1 is a longitudinal section through reaction-apparatus having a rectangular cross-section in which there is a tubular reactor in the center with two combustion heaters, placed one on either side of the reactor;

FIGURE 2 is a cross-section of a tubular reactor, taken on the line 2—2 of FIGURE 1;

FIGURE 3 is a cross-section of a combustion heater, taken on the line 3—3 of FIGURE 1;

Figure 5:
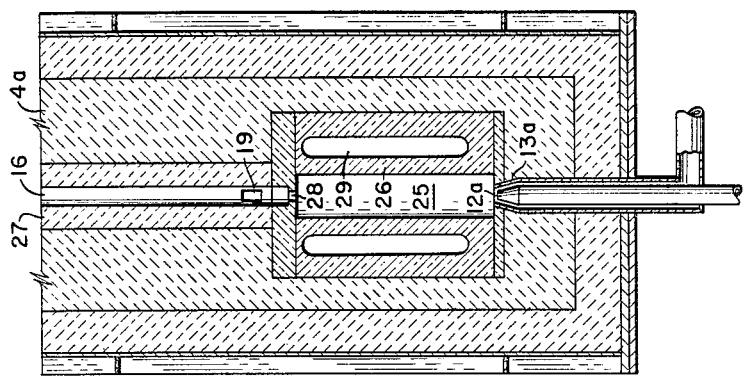
FIGURE 5 is an enlarged sectional view of a part of a modified combustion heater provided with a precombustion chamber.
Figure 4:
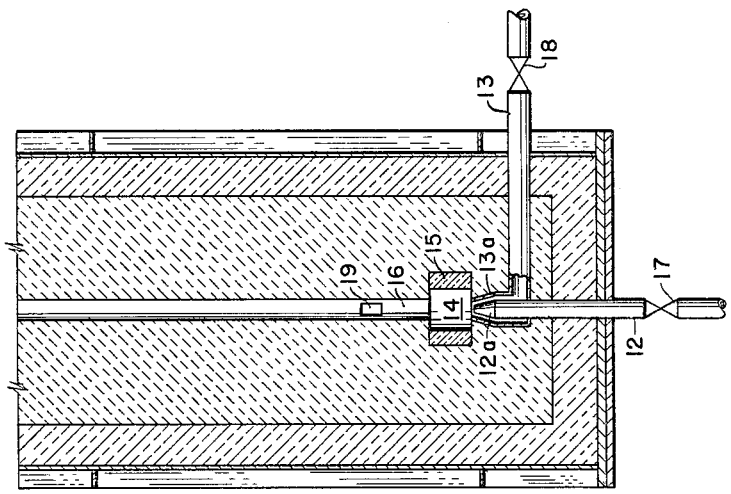
FIGURE 4 is an enlarged sectional view of the bottom of the combustion heater.

The apparatus of FIGURES 1–4 comprises a steel jacket 1 lined with a layer of heat-insulating bricks 2. The central space 3 is a reservoir containing the heat transfer medium and is surrounded by a layer of bricks 4, which are resistant both to the high temperature of this medium and to its chemical effects. In this space are provided a tubular reactor 5 and two combustion heaters, generally designated at 6. These may be formed by channels left open within the brick layer 4, as will appear, although separate tubes, e.g., of ceramic material, may be used.

The feed, consisting of or containing the base material to be reacted, is passed into the bottom of the tubular reactor 5 through the nozzle 7 and flows upwards at high velocity. The heat transfer medium is simultaneously drawn in through the openings 8 and is dispersed in the rising stream. At the top of the reactor the heat transfer medium is separated from the product in a separator device 9, and drops back via channel 10 into the chamber 3. The reaction product is discharged via channels 11.

Fuel and oxygen or oxygen-containing gas are admitted to the combustion heaters through pipes 12 and 13 respectively. These debouch upwards via concentric nozzles 12a and 13a into a precombustion chamber 14 which is enclosed by a refractory ring 15 and communicates at the top with the lower end of the riser passage 16. The flow of fuel and combustion air are controlled by valves 17 and 18, respectively. The brick 4 contains inclined feed passages 19 which extend between the space 3 and the riser passages 16, through which the heat transfer medium is drawn in for subsequent dispersal in the combustion gases flowing through riser passages. Above the riser passages in spaced relation above the top thereof is a separator block 20 having a pair of downwardly concave deflecting surfaces joined at a downwardly directed ridge 21 which is positioned directly above the passages. As a result of the centrifugal force generated by the flow of the mixture along the said surfaces, the liquid is expelled to the sides and downwardly, as viewed in FIGURE 3, and flows back into the reservoir 3 through the inclined channels 22. The gas, thus separated from the liquid, flows horizontally into the top of the reservoir 3 independently of the separated liquid and escapes thence through the gas channels 23 and the discharge lines 24.

The separator 9 above the tubular reactor is constructed as was described for the separators 20 above the combustion heaters.

The combustion heater shown in FIGURE 5 includes a precombustion chamber 25, surrounded by refractory lining 26, to the bottom of which fuel and oxygen or oxygen-containing gas are admitted via the concentric nozzles 12a and 13a. The riser passage in the brick 4a is formed by a ceramic tube 27 suitable to resist erosion and the high temperatures involved. This passage communicates with the space 3 through an inclined feed passage 19, as previously described. The top wall of the precombustion chamber has an opening 28 which is smaller than the cross sectional area of the passage through the tube 27, to promote a high gas velocity, thereby improving the ejector action and reducing the likelihood of liquid falling into the precombustion chamber. Further, the wall 26 of the precombustion chamber preferably has a passage 29 through which a coolant, e.g., combustion air prior to flow through the pipe 13, can be circulated for cooling the said wall.

*Example I*

The following example is based on an experiment carried out in an apparatus of the above-described construction. The two combustion heaters were provided with a precombustion chamber having a length of 25 cm. and a diameter of 6 cm., and a riser 120 cm. long and 6.5 cm. in diameter.

This apparatus was used for preparing ethylene and propylene, starting from propane. For this purpose the apparatus was charged with 600 kg. of a mixture of 80% of barium choleride and 20% of sodium chloride, which was kept at a temperature of 900° C. by combustion likewise of propane in the burners of the two heaters. At a feed rate of 8 kg. of propane per hour to each of the burners a heat production of $5.6 \times 10^7$ kcal./m.$^3$ was obtained, 63% of which was transferred to the salt.

Propane was fed into the reactor as base material at a rate of 75 kg./h. The resultant product was of the following composition:

|  | Percent v. | Percent w. |
| --- | --- | --- |
| $H_2$ | 16.9 | 1.5 |
| $CH_4$ | 31.4 | 22.3 |
| $C_2H_4$ | 30.4 | 37.8 |
| $C_2H_6$ | 4.7 | 6.3 |
| $C_3H_6$ | 6.1 | 11.3 |
| $C_3H_8$ | 9.6 | 18.6 |
| $C_4H_8$ | 0.9 | 2.2 |

Of the base material, less than 1% was converted into carbonaceous contaminants, which were removed from the heat transfer medium during the regeneration in the combustion heater. 49.1% of the base material was converted into the monoolefins ethylene and propylene, which are used in the chemical industry.

*Example II*

The same apparatus as referred to in Example I was used for cracking gasoline to a gas mixture containing ethylene and propylene. The starting material was a gasoline having a boiling range of 40–100° C. The temperature of the heat transfer medium (a mixture of $BaCl_2$ and NaCl) was kept at 850° C. by means of the combustion of propane, as in the preceding example.

At a throughput of 100 kg. of gasoline per hour a product of the following composition was obtained:

|  | Percent v. | Percent w. |
| --- | --- | --- |
| $H_2$ | 14.6 | 1.1 |
| $CH_4$ | 29.6 | 18.3 |
| $C_2H_4$ | 31.0 | 33.5 |
| $C_2H_6$ | 3.2 | 3.7 |
| $C_3H_6$ | 10.3 | 16.7 |
| $C_3H_8$ | 2.0 | 3.4 |
| higher hydrocarbons | 9.3 | 23.3 |

Of the base material less than 1% was converted into carbonaceous contaminants which were removed from the heat transfer medium during the regeneration in the combustion heaters. 50.2% of the base material was converted into the monoolefins ethylene and propylene.

We claim as our invention:

1. In the process of carrying out endothermic chemical reactions at high temperature by means of a hot molten, normally solid, heat transfer medium by bringing a stream of said medium into contact with a stream of a reactant within a reaction zone and separating the resulting reaction products from said medium, the improvement of supplying heat to said molten medium by combining a fuel and an oxygen-containing gas at a lower part of a combustion heating zone, flowing the resultant hot combustion gases upwards through a contacting zone, admitting said molten medium to said contacting zone at a level above said lower part of the combustion zone and entraining the molten medium in said hot combustion gases in finely divided state by ejector action, separating the heated molten medium from the combustion gases and discharging both from said contacting zone, and transferring the discharged medium to said reaction zone.

2. Process as defined in claim 1 wherein said molten medium is a salt.

3. Apparatus for carrying out endothermic chemical reactions at high temperature by means of a hot molten, normally solid heat transfer medium, which comprises:
   (a) a combustion heater for supplying heat to said molten medium which includes
      (1) a confined, vertically elongated contacting chamber having at a lower part thereof a feed inlet for admitting said molten medium,
      (2) means for supplying fuel and an oxygen-containing gas to a part of said heater below said feed inlet for combustion and upward flow of the resulting hot combustion gases through said contacting zone past said feed inlet to entrain the admitted molten medium in finely subdivided state, and
      (3) an outlet for discharging the molten medium and combustion gases from an upper part of the contacting chamber, and
   (b) a reactor including a vertically elongated reaction chamber having inlet means for supplying a stream of reactant and a stream of hot molten medium discharged from said combustion heater into a lower part of the chamber and disposed for upward flow of a mixture of said streams upwards through the chamber, and an outlet for discharging the resulting reaction products and molten medium from an upper part of the chamber.

4. Apparatus as defined in claim 3 wherein said contacting chamber is an upright riser tube, said feed inlet being an opening at a lower part of the tube wall, and said means for supplying fuel and gas comprise a central supply nozzle for the fuel and a second nozzle for the said gas surrounding the fuel supply nozzle coaxially.

5. Apparatus as defined in claim 4 wherein said fuel

6. Apparatus as defined in claim 3 wherein the heater includes a precombustion chamber situated beneath said contacting chamber, and wall means between said chambers, said wall means having an opening smaller than the cross sectional area of said precombustion chamber and that of the contacting chamber, said means for supplying the fuel and gas being disposed to feed into said precombustion chamber.

7. Apparatus as defined in claim 6 wherein said means for supplying fuel and gas comprise a central supply nozzle discharging into the precombustion chamber and a supply nozzle for said gas surrounding the fuel supply nozzle coaxially.

8. Apparatus as defined in claim 3 wherein said contacting chamber has a ratio of length to diameter between 5:1 and 30:1.

9. Apparatus for carrying out endothermic chemical reactions at high temperature by means of a hot molten, normally solid heat transfer medium which comprises:
   (a) a closed vessel defining a reservoir for said molten medium,
   (b) a tubular reactor which includes
      (1) an upright tube,
      (2) inlet means for supplying a reactant and hot molten medium from said reservoir for admixture with the reactant and flow through the reactor, and
      (3) outlet means for discharging reaction products and molten medium from the reactor and returning the molten medium to said reservoir, and (c) a combustion heater for supplying heat to said molten medium which includes (1) an upright riser tube forming a contacting chamber having, near the bottom, an inlet opening in communication with said reservoir for the influx of molten medium, (2) means for supplying fuel and an oxygen-containing gas to the heater below said inlet opening for combustion and upward flow of the resulting hot combustion gases through said tube past said inlet opening to entrain molten medium in finely divided state, and (3) an outlet at the top for discharging said combustion gases and molten medium from the tube, said outlet being in communication with said reservoir for return of heated molten medium into the reservoir.

10. Apparatus as defined in claim 9 wherein said tubular reactor and combustion heater are situated within said closed vessel, said vessel including separate outlet means for discharging the reactants and the combustion gases emanating respectively from the reactor and heater.

11. Apparatus as defined in claim 9 wherein said combustion heater is situated within said closed vessel and said vessel contains, above the riser tube, means for separating the combustion gases from the molten medium, said means including a wall having a concave surface directed toward the tube outlet so as to effect separation by inertia, and an outlet from said vessel for the separated combustion gases.

References Cited by the Examiner
UNITED STATES PATENTS

| | | | |
|---|---|---|---|
| 1,948,345 | 2/34 | Garofalo | 208—125 |
| 2,765,359 | 10/56 | Pichler et al. | 260—679 |
| 2,833,839 | 5/58 | Lehrer | 260—679 |
| 3,081,256 | 3/63 | Hendal et al. | 208—132 |

ALPHONSO D. SULLIVAN, *Primary Examiner.*